US008885022B2

(12) United States Patent
Gay et al.

(10) Patent No.: US 8,885,022 B2
(45) Date of Patent: *Nov. 11, 2014

(54) VIRTUAL CAMERA CONTROL USING MOTION CONTROL SYSTEMS FOR AUGMENTED REALITY

(75) Inventors: Michael Gay, Collinsville, CT (US); Aaron Thiel, Durham, CT (US)

(73) Assignee: Disney Enterprises, Inc., Burbank, CA (US)

( * ) Notice: Subject to any disclaimer, the term of this patent is extended or adjusted under 35 U.S.C. 154(b) by 542 days.

This patent is subject to a terminal disclaimer.

(21) Appl. No.: 12/655,683

(22) Filed: Jan. 4, 2010

(65) Prior Publication Data

US 2011/0164030 A1 Jul. 7, 2011

(51) Int. Cl.
*G06T 15/00* (2011.01)
*G06T 19/00* (2011.01)

(52) U.S. Cl.
CPC ...................................... *G06T 19/00* (2013.01)
USPC .......................................................... 348/47

(58) Field of Classification Search
None
See application file for complete search history.

(56) References Cited

U.S. PATENT DOCUMENTS

| 5,423,554 | A | * | 6/1995 | Davis | 463/4 |
| 5,487,172 | A | | 1/1996 | Hyatt | |
| 5,745,126 | A | | 4/1998 | Jain | |
| 5,973,807 | A | * | 10/1999 | Buchkremer et al. | 359/25 |
| 7,415,126 | B2 | | 8/2008 | Breed | |
| 7,448,063 | B2 | | 11/2008 | Freeman | |
| 7,576,727 | B2 | | 8/2009 | Bell | |
| 8,014,985 | B2 | * | 9/2011 | Clavadetscher | 703/6 |
| 2003/0001880 | A1 | | 1/2003 | Holtz | |
| 2005/0171964 | A1 | | 8/2005 | Kulas | |
| 2007/0223910 | A1 | * | 9/2007 | Aoki et al. | 396/301 |
| 2007/0238981 | A1 | * | 10/2007 | Zhu et al. | 600/424 |
| 2008/0263460 | A1 | * | 10/2008 | Altberg et al. | 715/757 |
| 2009/0116732 | A1 | * | 5/2009 | Zhou et al. | 382/154 |
| 2009/0170600 | A1 | * | 7/2009 | Komatsumoto | 463/32 |

FOREIGN PATENT DOCUMENTS

| WO | WO2005078597 | 8/2005 |
| WO | WO2008148888 | 12/2008 |

OTHER PUBLICATIONS

Pea, *Video-as-data and digital video manipulation techniques for transforming learning sciences research, education and other cultural practices*, Stanford University (Dec. 30, 2004) Retrieved from the Internet <http://www.stanford.edu/class/educ299x/HVLE_DIVER_123004.pdf>.

(Continued)

*Primary Examiner* — Sath V Perungavoor
*Assistant Examiner* — Kate Luo
(74) *Attorney, Agent, or Firm* — Farjami & Farjami LLP

(57) ABSTRACT

There is provided a system and method for integrating a virtual rendering system and a motion control system to provide an augmented reality. There is provided a method for integrating a virtual rendering system and a motion control system for outputting a composite render to a display, the method comprising obtaining, from the motion control system, a robotic camera configuration of a robotic camera in a real environment, programming the virtual rendering system using the robotic camera configuration to correspondingly control a virtual camera in a virtual environment, obtaining a virtually rendered feed using the virtual camera, capturing a video capture feed using the robotic camera, rendering the composite render by processing the feeds, and outputting the composite render to the display.

18 Claims, 4 Drawing Sheets

(56) References Cited

OTHER PUBLICATIONS

Benford, *Evaluating Out of This World: An Experiment in Inhabited Television*, KTH, Royal Institute of Technology (Sweden), (Feb. 1999) Retrieved from the Internet <http://cid.nada.kth.se/pdf/cid_83.pdf>.

Klein, *An Image-Based Framework for Animated Nonphotorealistic Rendering*, Princeton University (Nov. 2002) Retrieved from the Internet <http://citeseerx.ist.psu.edu/viewdoc/download?doi=10.1.1.4.6254&rep=rep1&type=pdf>.

Stavchansky, *Acquiring Knowledge of Digital Video Manipulation Techniques and its Effect on the Perceived Credibility of Television News*, The University of Texas at Austin (Dec. 2007).

\* cited by examiner

VIRTUAL CAMERA CONTROL USING MOTION CONTROL SYSTEMS FOR AUGMENTED REALITY

BACKGROUND OF THE INVENTION

1. Field of the Invention

The present invention relates generally to digital video. More particularly, the present invention relates to digital video rendering.

2. Background Art

Modern commodity PC hardware and videogame consoles are often equipped with sufficient processing capability to enable high-resolution real-time three-dimensional graphics rendering. Even portable devices such as mobile phones and handheld gaming systems are often equipped with scaled down real-time three-dimensional graphics support. Such low-cost commodity graphics processing hardware has enabled a wide variety of entertainment and productivity applications to support enhanced visual presentations for greater user engagement and enjoyment.

In particular, real-time three-dimensional graphics rendering has found itself as a highly supportive role in live broadcast programming. For example, coverage of sports and other live events can be readily enhanced with composite renderings using three-dimensional graphics for alternative or substitute object rendering, strategy simulations, information boxes, alternative viewpoints, and other effects. Although three-dimensional analysis tools exist for composite rendering, such tools cannot be used to accurately replay prior camera paths using manually controlled camera systems. As a result, important past events such as a winning play or a brilliant strategy cannot be effectively analyzed. Furthermore, manually controlled camera systems are difficult to synchronize with virtual environment camera systems, as the camera operator cannot perceive the virtual environment. Absent such synchronization, it is difficult to create acceptable composite rendering within real-time constraints. As a result, viewer engagement is low since analysis is limited to imprecise and unsynchronized manually controlled camera movements.

Accordingly, there is a need to overcome the drawbacks and deficiencies in the art by providing a way to create composite renderings using live footage with real-time three-dimensional graphics rendering for high viewer impact and engagement.

SUMMARY OF THE INVENTION

There are provided systems and methods for integrating a virtual rendering system and a motion control system to provide an augmented reality, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present application is directed to a system and method for integrating a virtual rendering system and a motion control system to provide an augmented reality. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1:
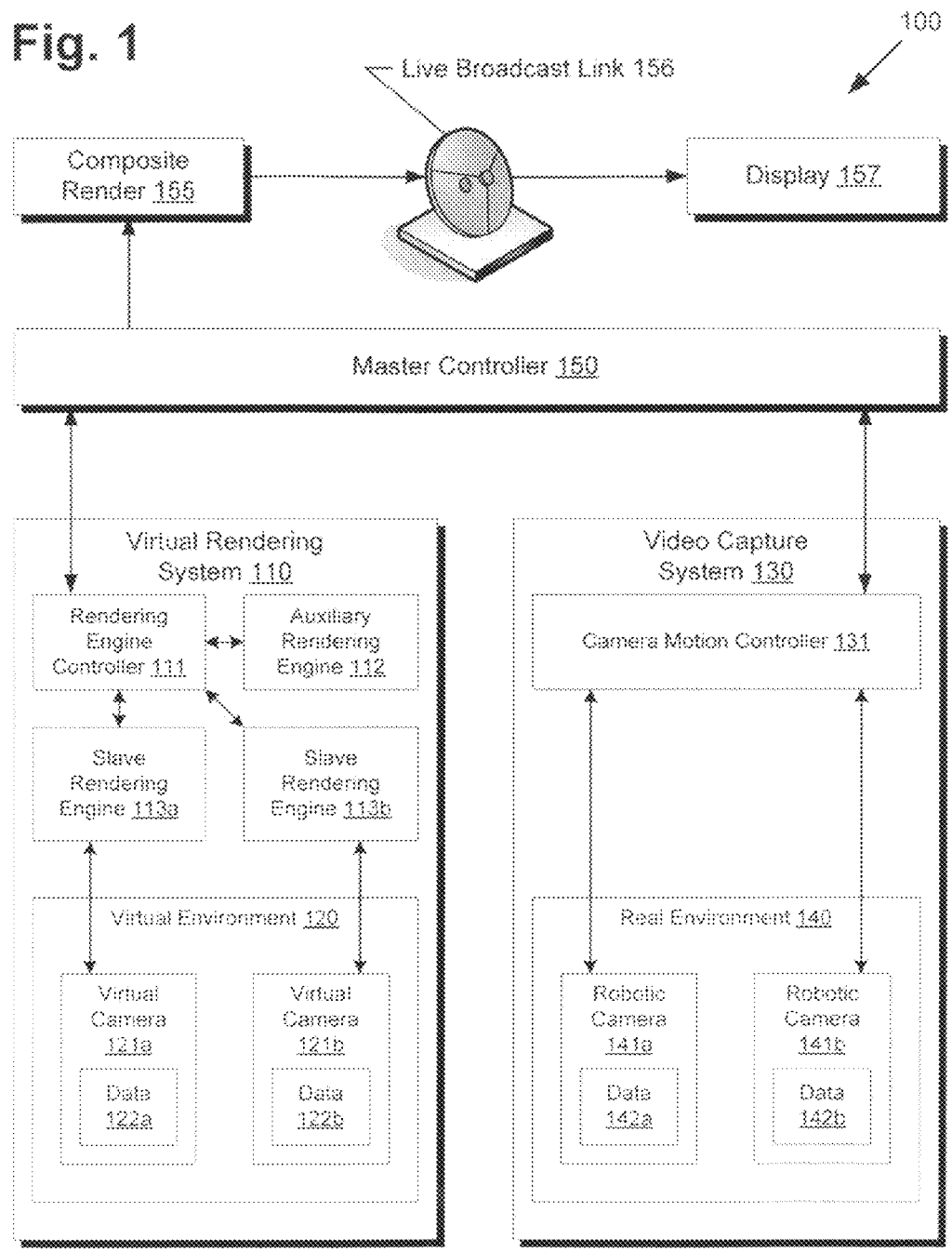
FIG. 1 presents a system for integrating a virtual rendering system and a motion control system to provide an augmented reality, according to one embodiment of the present invention.

FIG. 1 presents a system for integrating a virtual rendering system and a motion control system to provide an augmented reality, according to one embodiment of the present invention. Diagram 100 of FIG. 1 includes virtual rendering system 110, video capture system 130, master controller 150, composite render 155, live broadcast link 156, and display 157. Virtual rendering system 110 includes rendering engine controller 111, auxiliary rendering engine 112, slave rendering engines 113a-113b, and virtual environment 120. Virtual environment 120 includes virtual cameras 121a-121b. Virtual camera 121a includes data 122a. Virtual camera 121b includes data 122b. Video capture system 130 includes camera motion controller 131 and real environment 140. Real environment 140 includes robotic cameras 141a-141b. Robotic camera 141a includes data 142a. Robotic camera 141b includes data 142b.

Rendering engine controller 111, auxiliary rendering engine 112, slave rendering engine 113a, and slave rendering engine 113b may each execute on several separate servers, each comprising standard commodity PC hardware or a videogame console system. Alternatively, the engines of virtual rendering system 110 may be consolidated into a single server, or distributed remotely across a network to minimize the amount of necessary on-site hardware. Rendering engine controller 111 may coordinate control and data sharing between the different rendering subsystems, as shown in FIG. 1. Auxiliary rendering engine 112 may provide static graphics overlays and other graphical effects that do not require input from virtual environment 120. Slave rendering engines 113a-113b each control virtual cameras 121a-121b respectively to receive a virtually rendered feed of virtual environment 120.

Real environment 140 corresponds to an actual physical environment represented by virtual environment 120. For example, real environment 140 might comprise an indoor or outdoor sports field or stadium, a golf course, a natural environment, an urban environment, or any other locale. Besides sports entertainment environments, other environments for focuses such as educational or informational applications may also be used. Virtual environment 120 may then be created using manual three-dimensional environmental modeling, automated photographic or video extrapolation, or some other manual or automated method.

Data 142a-142b describing the configuration of robotic cameras 141a-141b within real environment 140 may each include, for example, position data such as three-dimensional coordinates, camera field of view orientation data such as camera angle, focal length and focus distance, movement data such as a motion path or velocity and acceleration, and camera characteristics such as lens parameters, camera size, center of lens, and other camera model details. Three-dimensional coordinates between virtual environment 120 and real environment 140 may be defined using a common frame of reference, such as setting a particular corner of a field or a particular landmark as a common (0, 0, 0) coordinate. The motion path may then describe the changing of the above data parameters with respect to time, such as the three-dimensional coordinates with respect to time or the camera field of view with respect to time.

Master controller 150 may receive data 142a-142b from camera motion controller 131 of video capture system 130. Camera motion controller 131 may, for example, query robotic cameras 141a-141b to retrieve data 142a-142b, respectively. The motion path data in data 142a-142b may be dictated by manual control such as by a camera operator, by tracking the motion of a particular object or focusing on a particular scene in either virtual environment 120 or real environment 140, by replaying a previously recorded path of movement or another predetermined path, by a video analysis using video capture system 130, or by using some other criteria. Tracked objects may include, for example, a ball or a participating player of a game such as a sports match, and may be virtual or real. Thus, robotic cameras 141a-141b can function as motion control cameras. Camera motion controller 131 might also accept user input to modify the motion paths contained in data 142a-142b.

Master controller 150 may then direct virtual rendering system 110 to control virtual cameras 121a-121b according to the retrieved motion path data from data 142a-142b. Once the virtual cameras are properly configured by appropriately programming the motion paths of data 122a-122b, master controller 150 may then query virtual rendering system 110 for virtually rendered feeds and video capture system 130 for video capture feeds. Master controller 150 may then act as a rendering controller by combining the feeds smoothly using standard broadcast key technology such as chroma key or key/fill to generate composite render 155, which includes real and virtual feed elements arranged in a specific desired manner for broadcast over live broadcast link 156 to display 157. Live broadcast link 156 may comprise, for example, a satellite uplink to a television studio, from where the broadcasted material is disseminated to the general public. Display 157 may then represent, for example, a television of a viewer watching the broadcast.

Although virtual rendering system 110 of FIG. 1 depicts only two slave rendering engines each controlling exactly one virtual camera, alternative embodiments may use any arbitrary number of slave rendering engines to control any arbitrary number of virtual cameras. More specifically, each slave rendering engine may control more than one virtual camera. Similarly, although video capture system 130 of FIG. 1 only depicts two robotic cameras, alternative embodiments may use any arbitrary number of robotic cameras to be controlled by camera motion controller 131 of video capture system 130. In this manner, the composite rendering system shown in FIG. 1 can be scaled to as many camera angles and viewpoints as desired, in either virtual environment 120 or real environment 140.

Figure 2:
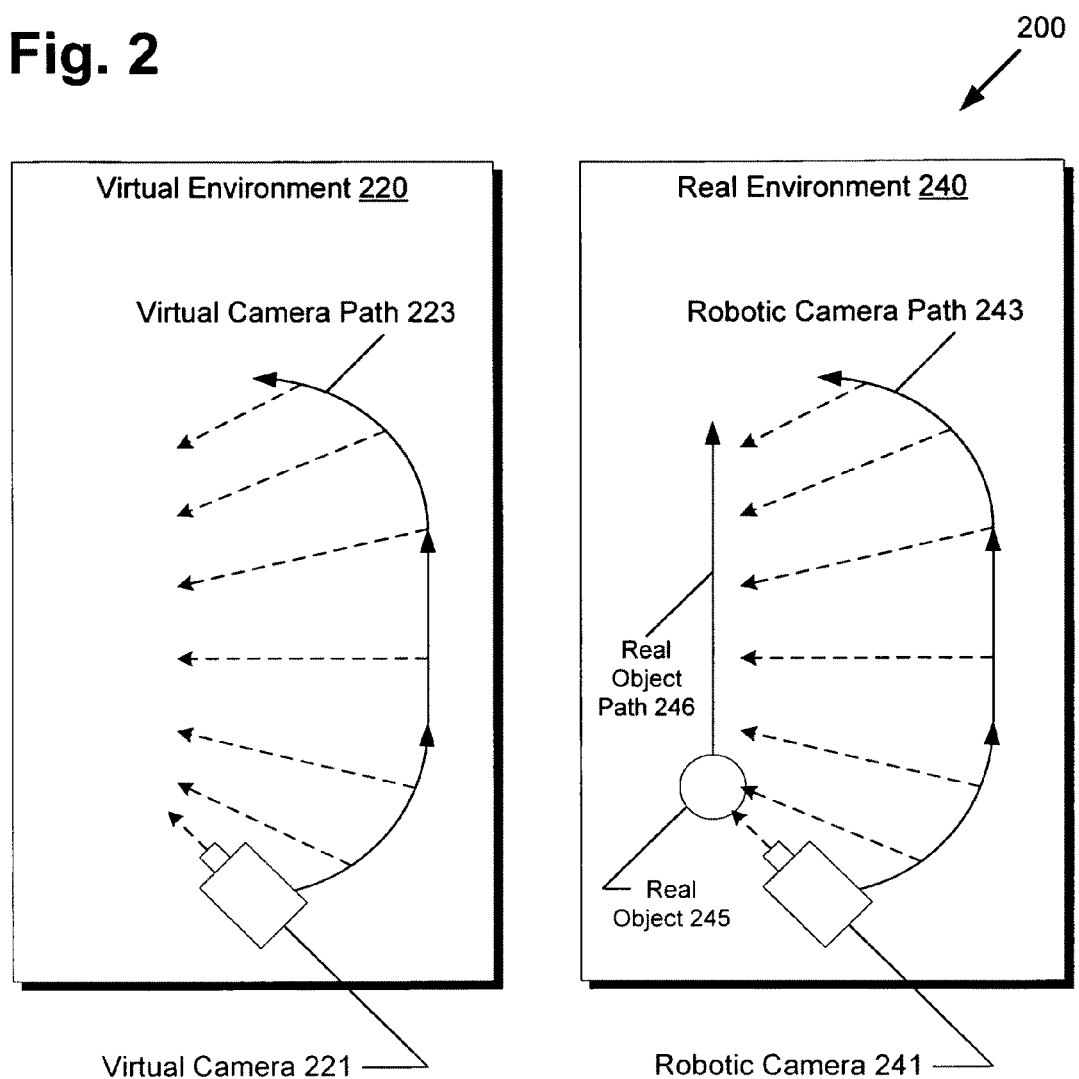
FIG. 2 presents a diagram of a virtual camera path configured to match a robotic camera path used by a motion control system, according to one embodiment of the present invention.

FIG. 2 presents a diagram of a virtual camera path configured to match a robotic camera path used by a motion control system, according to one embodiment of the present invention. Diagram 200 of FIG. 2 includes virtual environment 220 and real environment 240. Virtual environment 220 includes virtual camera 221 and virtual camera path 223. Real environment 240 includes robotic camera 241, robotic camera path 243, real object 245, and real object path 246. With regards to FIG. 2, it should be noted that virtual environment 220 corresponds to virtual environment 120 from FIG. 1 and that real environment 240 corresponds to real environment 140 from FIG. 1. Moreover, although FIG. 2 only depicts a single virtual camera and a single robotic camera for simplicity, alternative embodiments may use multiple virtual cameras and multiple robotic cameras.

As previously discussed in FIG. 1, master controller 150 may direct video capture system 130 to control virtual cameras according to motion paths provided by a motion control system. FIG. 2 shows an example of this manner of control, where robotic camera 241, comprising a motion control camera such as a gantry supported fly-by camera, is programmed to record a path of movement. For example, robotic camera 241 may be programmed to focus on the movement of real object 245, a football, following real object path 246, a long distance pass. Thus, robotic camera 241 may follow robotic camera path 243, with camera orientation following real object path 246 as indicated by the dotted arrows. Robotic camera path 243 may then be recorded and programmed into virtual camera 221 of virtual environment 220, so that virtual camera 221 can follow virtual camera path 223 mirroring robotic camera path 243.

As shown in FIG. 2, the camera orientation of virtual camera 221 moves as if it were following real object path 246 within virtual environment 220, even though there is no corresponding virtual object for real object 245 in virtual environment 220. By using the system described above in FIG. 1, virtual camera 221 can thus be synchronized to the camera movements of robotic camera 241. Composite rendering of real and virtual environments, also known as "augmented reality", is thus facilitated, as the camera views in virtual environment 220 and real environment 240 can be matched according to any desired camera path, opening up limitless possibilities for dynamic camerawork. Previously recorded camera paths may also be recorded into storage for future replay, both by robotic cameras and virtual cameras.

The example shown in FIG. 2 might be used, for example, to present a dynamic panning camera view showing the long distance football pass defined by real object path 246 according to several virtual scenarios. For example, players might be virtually positioned and simulated in various scenarios to determine whether an alternative strategy might have resulted in an interception of the pass. Thus, a composite render might show a real sports field background and the actual football, or real object 245, in a video feed captured from real environment 240, but with virtual players rendered in virtual environment 220. Thus, the composite render can provide a realistic camera fly-by with the football and background elements from real environment 240 and virtual players rendered from virtual environment 220. Variations of this procedure may be used to present various hypothetical plays and strategy analyses in a realistic and engaging manner for high viewer impact.

Figure 3:
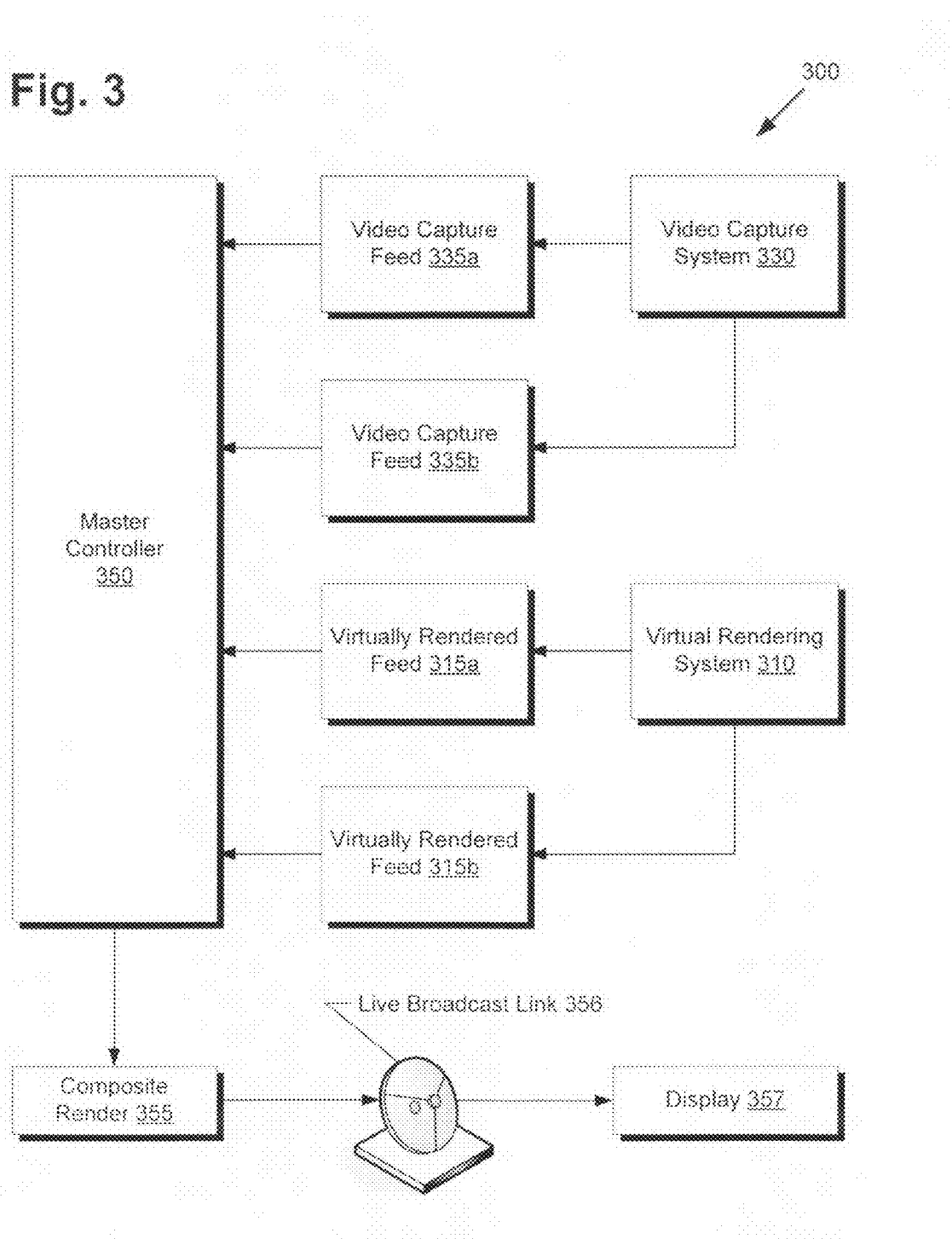
FIG. 3 presents a diagram of a composite render being generated, according to one embodiment of the present invention.

FIG. 3 presents a diagram of a composite render being generated, according to one embodiment of the present invention. Diagram 300 of FIG. 3 includes virtual rendering system 310, virtually rendered feeds 315a-315b, video capture system 330, video capture feeds 335a-335b, master controller 350, composite render 355, live broadcast link 356, and display 357. With regards to FIG. 3, it should be noted that virtual rendering system 310 corresponds to virtual rendering system 110 from FIG. 1, that video capture system 330 corresponds to video capture system 130, that master controller 350 corresponds to master controller 150, that composite render 355 corresponds to composite render 155, that live broadcast link 356 corresponds to live broadcast link 156, and that display 357 corresponds to display 157.

As shown in FIG. 3, virtual rendering system 310 provides master controller 350 with virtually rendered feeds 315a-315b, while video capture system 330 provides master controller 350 with video capture feeds 335a-335b. For example, video capture feed 335a might correspond to a feed generated by robotic camera 241 in FIG. 2, whereas virtually rendered feed 315a might correspond to a feed generated by virtual camera 221 in FIG. 2. Virtually rendered feed 315b may correspond to a feed created by an overhead virtual camera providing a bird's eye overview of virtual environment 220 from FIG. 2, whereas video capture feed 335b may correspond to a feed created by an overhead robotic camera providing a bird's eye overview of real environment 240 from FIG. 2.

Master controller 350 may then combine virtually rendered feed 315a and video capture feed 335a for an augmented reality fly-by scene and also combine virtually rendered feed 315b and video capture feed 335b for an augmented reality bird's eye overview scene. As previously discussed, master controller 350 may use standard broadcast key technologies to combine the different feeds smoothly so that the juxtaposition of real and virtual elements is visually unobtrusive. Master controller 350 may then use these combined scenes in composite render 355 through various presentation methods such as split screen, cascaded or tiled frames, "picture-in-picture", three-dimensional surfaces, and other formatted layouts. Master controller 350 may then forward composite render 355 over live broadcast link 356 for showing on display 357.

Master controller 350 may repeat the above process of generating composite render 355 in a periodic manner, such as 24, 30, or 60 times per second or higher in order to accommodate a desired video broadcasting framerate.

Although FIG. 3 only shows a single composite render 355, alternative embodiments may use several composite renders. For example, master controller 350 may generate multiple composite renders to provide different camera views for multiple broadcast channels, to customize based on a target broadcast region or audience demographics, to focus on a particular team in a sports match, or to support any other broadcasting application that may require multiple concurrent video streams. By adding additional slave rendering engines and robotic cameras, augmented reality rendering systems can be readily scaled and configured to support large-scale projects.

Figure 4:
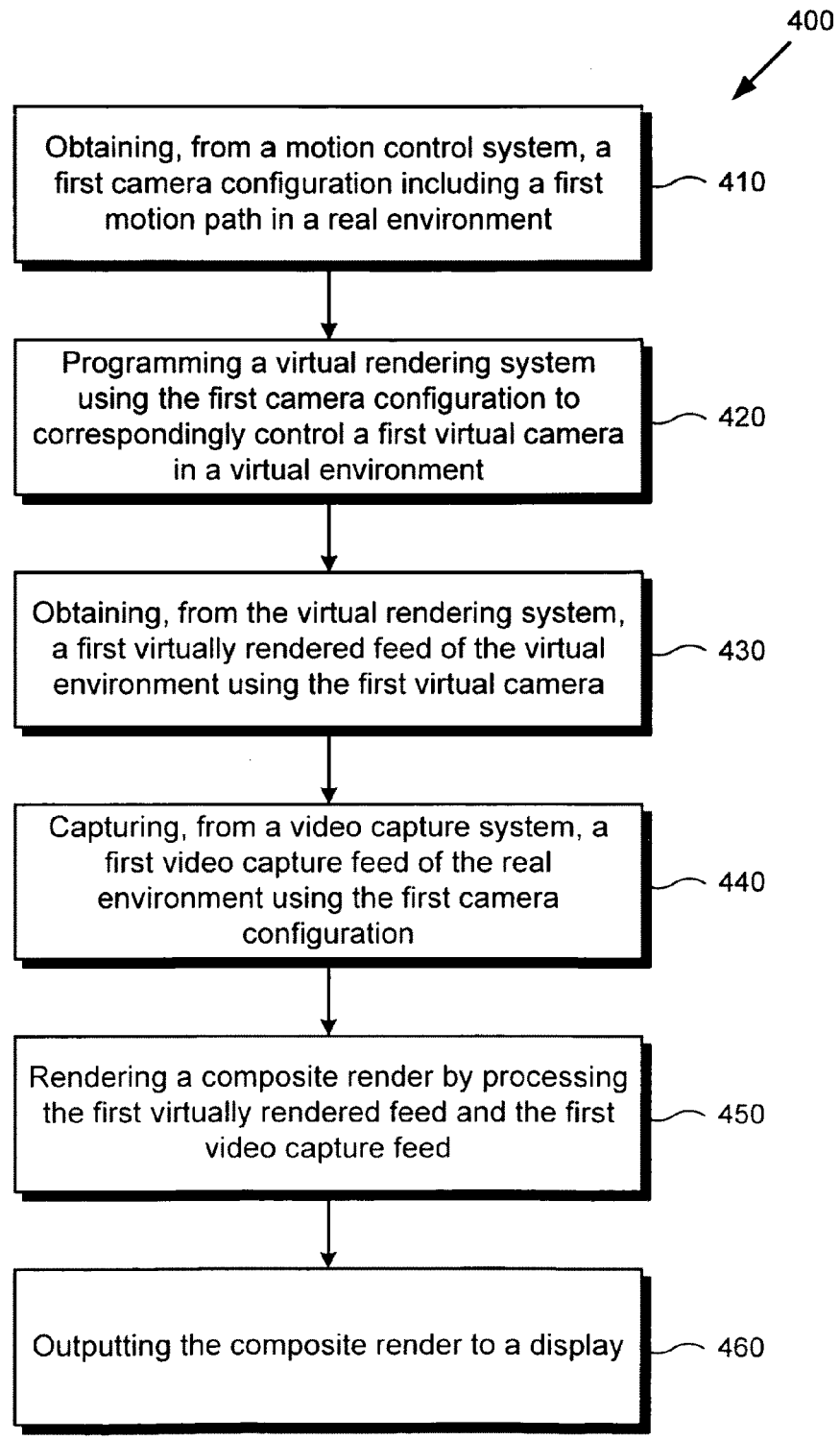
FIG. 4 shows a flowchart describing the steps, according to one embodiment of the present invention, by a virtual rendering system and a motion control system may be integrated for outputting a composite render of an augmented reality to a display.

FIG. 4 shows a flowchart describing the steps, according to one embodiment of the present invention, by a virtual rendering system and a motion control system may be integrated for outputting a composite render of an augmented reality to a display. Certain details and features have been left out of flowchart 400 that are apparent to a person of ordinary skill in the art. For example, a step may comprise one or more substeps or may involve specialized equipment or materials, as known in the art. While steps 410 through 460 indicated in flowchart 400 are sufficient to describe one embodiment of the present invention, other embodiments of the invention may utilize steps different from those shown in flowchart 400.

Referring to step 410 of flowchart 400 in FIG. 4 and diagram 100 of FIG. 1, step 410 of flowchart 400 comprises obtaining, from camera motion controller 131 of video capture system 130, data 142a of robotic camera 141a in real environment 140. Camera motion controller 131 may then retrieve data 142a from robotic camera 141a for relaying back to master controller 150. As previously described, data 142a may contain various information concerning the configuration of robotic camera 141a such as three-dimensional position and movement, camera focus and view, camera model parameters, and other details.

Referring to step 420 of flowchart 400 in FIG. 4 and diagram 100 of FIG. 1, step 420 of flowchart 400 comprises programming virtual rendering system 110 using data 142a obtained from step 410 to correspondingly control virtual camera 121a in virtual environment 120. For example, master controller 150 may instruct rendering engine controller 111 to program values into data 122a to match data 142a as closely as possible. As previously discussed, data 142a may include three-dimensional coordinates and camera field of view with respect to time. Assuming virtual camera 221 and robotic camera 241 correspond to virtual camera 121a and robotic camera 141a, the result of setting data 122a to match data 142a may be manifested by virtual camera path 223 mimicking robotic camera path 243, as shown in FIG. 2.

Referring to step 430 of flowchart 400 in FIG. 4, diagram 200 of FIG. 2, and diagram 300 of FIG. 3, step 430 of flowchart 400 comprises obtaining, from virtual rendering system 310, virtually rendered feed 315a of virtual environment 220 using virtual camera 221. Since the motion path of virtual camera 221 was previously programmed in step 420, step 430 results in master controller 350 receiving virtually rendered feed 315a comprising fly-by footage according to virtual camera path 223.

Referring to step 440 of flowchart 400 in FIG. 4, diagram 200 of FIG. 2, and diagram 300 of FIG. 3, step 440 of flowchart 400 comprises obtaining, from video capture system 330, video capture feed 335a of real environment 240 using robotic camera 241. As previously discussed, robotic camera path 243 may be defined in any number of ways, such as by manual control, object tracking, recorded motion replay, or predetermined paths. As shown in FIG. 2, robotic camera path 243 is defined as an arc with the camera field of view following real object 245 as it progresses through real object path 246. Thus, master controller 350 may receive video capture feed 335a comprising fly-by footage according to robotic camera path 243, wherein the feed includes a rendering of real object 245.

Referring to step 450 of flowchart 400 in FIG. 4 and diagram 300 of FIG. 3, step 450 of flowchart 400 comprises rendering composite render 355 by processing video capture feed 335a from step 440 and virtually rendered feed 315a from step 430. As previously discussed, master controller 350 may accomplish step 450 using standard broadcast key technology such as chroma key or key/fill techniques to isolate and combine components from each feed to produce a result with a smooth visual juxtaposition of real and virtual elements.

Referring to step 460 of flowchart 400 in FIG. 4 and diagram 300 of FIG. 3, step 460 of flowchart 400 comprises outputting composite render 355 from step 450 to display 357. As shown in FIG. 3, master controller 350 may send composite render 355 using live broadcast link 356, which might comprise a satellite uplink to a broadcast station for public dissemination. Eventually, composite render 355 shows on display 357, which might comprise the television of a viewer at home.

While the above steps 410-460 have been described with respect to a single virtual camera, a single robotic camera, and a single composite render, steps 410-460 may also be repeated as necessary to support multiple virtual cameras, multiple robotic cameras, and multiple composite renders, as previously described. In this manner, the described rendering system can be flexibly scaled to larger projects by increasing the number of slave rendering systems and robotic cameras to handle additional feeds in real-time.

In this manner, live events such as sports can be enhanced with high-impact augmented reality segments by leveraging the cost effective real-time graphical capabilities of modern commodity PC hardware and game consoles. This can provide networks with a competitive advantage by drawing in and retaining greater viewership by providing compelling augmented reality content while requiring only minor additional infrastructure outlays over standard rendering systems. Since commodity hardware parts are used and numerous effective virtual rendering systems and engines are available for licensing, expensive proprietary systems and vendor lockout may be avoided, further reducing total cost of ownership.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A method for integrating a virtual rendering system and a motion control system to output a composite render to a display, the method comprising:
   obtaining, from the motion control system, a first camera configuration, wherein the first camera configuration includes camera position data, camera field of view orientation data, camera movement data and camera lens characteristics data;
   programming the virtual rendering system using the first camera configuration to correspondingly control a first virtual camera in a virtual environment;
   obtaining, from the virtual rendering system, a first virtually rendered feed of the virtual environment using the first virtual camera;
   capturing, from a video capture system, a first video capture feed of a real environment using the first camera configuration;
   rendering the composite render, based on a target broadcast region, by processing the first virtually rendered feed and the first video capture feed, wherein the composite render includes a real tracked object and at least one virtual player in the virtual environment; and
   outputting the composite render to the display.

2. The method of claim 1, wherein the first motion path includes a three-dimensional position with respect to time.

3. The method of claim 1, wherein the first motion path includes a camera orientation or field of view with respect to time.

4. The method of claim 1, wherein the camera lens characteristics data includes camera lens parameters.

5. The method of claim 1, wherein the first motion path is based on a predetermined path.

6. The method of claim 1, wherein the first motion path is based on a previously recorded path.

7. The method of claim 1, wherein the first motion path is based on a video analysis using the video capture system.

8. The method of claim 1 further comprising prior to the programming of the virtual rendering system, modifying the first motion path according to a user input.

9. The method of claim 1 further comprising prior to the rendering of the composite render:
   obtaining, from the motion control system, a second camera configuration including a second motion path in the real environment;
   programming the virtual rendering system using the second camera configuration to correspondingly control a second virtual camera in the virtual environment;
   obtaining, from the virtual rendering system, a second virtually rendered feed of the virtual environment using the second virtual camera;
   capturing, from a video capture system, a second video capture feed of the real environment using the second camera configuration;
   wherein the rendering of the composite render further processes the second virtually rendered feed and the second video capture feed.

10. A rendering controller for outputting a composite render to a display, the rendering device comprising:
    a processor configured to:
       obtain, from a motion control system, a first camera configuration, wherein the first camera configuration includes camera position data, camera field of view orientation data, camera movement data and camera lens characteristics data;
       program a virtual rendering system using the first camera configuration to correspondingly control a first virtual camera in a virtual environment;
       obtain, from the virtual rendering system, a first virtually rendered feed of the virtual environment using the first virtual camera;
       capture, from a video capture system, a first video capture feed of a real environment using the first camera configuration;
       render the composite render, based on a target broadcast region, by processing the first virtually rendered feed and the first video capture feed, wherein the composite render includes a real tracked object and at least one virtual player in the virtual environment; and
       output the composite render to the display.

11. The rendering controller of claim 10, wherein the first motion path includes a three-dimensional position with respect to time.

12. The rendering controller of claim 10, wherein the first motion path includes a camera orientation or field of view with respect to time.

13. The rendering controller of claim 10, wherein the camera lens characteristics data includes camera lens parameters.

14. The rendering controller of claim 10, wherein the first motion path is based on a predetermined path.

15. The rendering controller of claim 10, wherein the first motion path is based on a previously recorded path.

16. The rendering controller of claim 10, wherein the first motion path is based on a video analysis using the video capture system.

17. The rendering controller of claim 10, wherein prior to the programming of the virtual rendering system, the processor is configured to modify the first motion path according to a user input.

18. The rendering controller of claim 10, wherein prior to the rendering of the composite render the processor is configured to:
   obtain, from the motion control system, a second camera configuration including a second motion path in the real environment;
   program the virtual rendering system using the second camera configuration to correspondingly control a second virtual camera in the virtual environment;
   obtain, from the virtual rendering system, a second virtually rendered feed of the virtual environment using the second virtual camera; and
   capture, from a video capture system, a second video capture feed of the real environment using the second camera configuration;
   wherein the processor is configured to render the composite render by further processing the second virtually rendered feed and the second video capture feed.

* * * * *